(12) United States Patent
Holcomb

(10) Patent No.: US 8,160,132 B2
(45) Date of Patent: Apr. 17, 2012

(54) REDUCING KEY PICTURE POPPING EFFECTS IN VIDEO

(75) Inventor: Thomas W. Holcomb, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 957 days.

(21) Appl. No.: 12/070,181

(22) Filed: Feb. 15, 2008

(65) Prior Publication Data

US 2009/0207912 A1 Aug. 20, 2009

(51) Int. Cl.
*H04N 7/12* (2006.01)

(52) U.S. Cl. .............................. 375/240.01; 375/240.26

(58) Field of Classification Search .......................... None
See application file for complete search history.

(56) References Cited

U.S. PATENT DOCUMENTS

| | | | |
|---|---|---|---|
| 4,334,244 A | 6/1982 | Chan et al. | |
| 4,460,924 A | 7/1984 | Lippel | |
| 4,849,812 A | 7/1989 | Borgers et al. | |
| 5,089,889 A * | 2/1992 | Sugiyama | 375/240.12 |
| 5,289,283 A | 2/1994 | Hopper et al. | |
| 5,467,134 A | 11/1995 | Laney et al. | |
| 5,509,089 A | 4/1996 | Ghoshal | |
| 5,544,286 A | 8/1996 | Laney | |
| 5,585,861 A | 12/1996 | Taniguchi et al. | |
| 5,604,856 A | 2/1997 | Guenter et al. | |
| 5,611,038 A | 3/1997 | Shaw et al. | |
| 5,625,714 A | 4/1997 | Fukuda | |
| 5,646,691 A | 7/1997 | Yokoyama | |
| 5,787,203 A | 7/1998 | Lee et al. | |
| 5,799,113 A | 8/1998 | Lee | |
| 5,835,149 A | 11/1998 | Astle | |
| 5,835,495 A | 11/1998 | Ferriere | |
| 5,905,504 A | 5/1999 | Barkans et al. | |
| 5,923,784 A | 7/1999 | Rao et al. | |
| 5,926,209 A | 7/1999 | Glatt | |
| 5,946,419 A | 8/1999 | Chen et al. | |
| 5,959,693 A | 9/1999 | Wu et al. | |
| 5,969,764 A | 10/1999 | Sun et al. | |
| 6,026,190 A | 2/2000 | Astle | |
| 6,115,420 A | 9/2000 | Wang | |

(Continued)

FOREIGN PATENT DOCUMENTS

GB 1 218 015 1/1971

(Continued)

OTHER PUBLICATIONS

Turaga et al., "Content-Adaptive Filtering in the UMCTF Framework," *IEEE*, pp. 1-821 through 1-824 (2003).

Tziritas et al., "A Hybrid Image Coder: Adaptive Intra-Interframe Prediction Using Motion Compensation," *Sixth MDSP Workshop*, pp. 224-230 (1989).

(Continued)

*Primary Examiner* — Hong Cho
(74) *Attorney, Agent, or Firm* — Klarquist Sparkman, LLP

(57) ABSTRACT

Techniques and tools are described for reducing key picture popping effects. In some embodiments, an encoding system filters a video picture that is to be encoded as a key picture using intra-picture compression. The filtering reduces detail in the picture relative to other video pictures that are to be encoded using inter-picture compression. In many cases, the filtering reduces key picture popping effects by selectively attenuating detail in the picture that is to be encoded as a key picture. The encoding tool can use a key picture filter strength parameter to control strength of the filtering. The tool encodes the filtered video picture using intra-picture compression and encodes the other video pictures using inter-picture compression.

20 Claims, 6 Drawing Sheets

U.S. PATENT DOCUMENTS

| | | | |
|---|---|---|---|
| 6,115,689 | A | 9/2000 | Malvar |
| 6,125,147 | A | 9/2000 | Florencio et al. |
| 6,182,034 | B1 | 1/2001 | Malvar |
| 6,219,838 | B1 | 4/2001 | Cherichetti et al. |
| 6,278,735 | B1 | 8/2001 | Mohsenian |
| 6,281,942 | B1 | 8/2001 | Wang |
| 6,380,985 | B1 | 4/2002 | Callahan |
| 6,473,409 | B1 | 10/2002 | Malvar |
| 6,556,925 | B1 | 4/2003 | Mori et al. |
| 6,625,215 | B1 | 9/2003 | Faryar et al. |
| 6,728,317 | B1 | 4/2004 | Demos |
| 6,873,368 | B1 | 3/2005 | Yu et al. |
| 6,980,595 | B2 | 12/2005 | Rose et al. |
| 6,992,725 | B2 | 1/2006 | Mohsenian |
| 7,072,525 | B1 | 7/2006 | Covell |
| 7,158,668 | B2 | 1/2007 | Munsil et al. |
| 7,233,362 | B2 | 6/2007 | Wu |
| 7,308,151 | B2 | 12/2007 | Munsil et al. |
| 7,570,834 | B2 | 8/2009 | Deshpande |
| 2003/0058944 | A1* | 3/2003 | MacInnis et al. ........ 375/240.13 |
| 2004/0170395 | A1 | 9/2004 | Filippini et al. |
| 2004/0174464 | A1 | 9/2004 | MacInnis et al. |
| 2005/0021579 | A1 | 1/2005 | Bae et al. |
| 2005/0105889 | A1 | 5/2005 | Conklin |
| 2005/0152448 | A1* | 7/2005 | Crinon et al. ............ 375/240.01 |
| 2006/0083300 | A1* | 4/2006 | Han et al. ................. 375/240.03 |
| 2006/0126728 | A1 | 6/2006 | Yu et al. |
| 2006/0133689 | A1 | 6/2006 | Andersson et al. |
| 2006/0165176 | A1 | 7/2006 | Raveendran |
| 2006/0268991 | A1 | 11/2006 | Segall et al. |
| 2006/0274959 | A1 | 12/2006 | Piastowski |
| 2007/0002946 | A1 | 1/2007 | Bouton et al. |
| 2007/0091997 | A1 | 4/2007 | Fogg et al. |
| 2007/0140354 | A1 | 6/2007 | Sun |
| 2007/0160126 | A1 | 7/2007 | Van Der Meer et al. |
| 2007/0230565 | A1 | 10/2007 | Tourapis et al. |
| 2007/0268964 | A1* | 11/2007 | Zhao ........................... 375/240.1 |
| 2008/0008249 | A1 | 1/2008 | Yan |
| 2008/0013630 | A1 | 1/2008 | Li et al. |
| 2008/0024513 | A1 | 1/2008 | Raveendran |
| 2008/0068446 | A1 | 3/2008 | Barkley et al. |
| 2008/0089417 | A1 | 4/2008 | Bao et al. |
| 2008/0095235 | A1 | 4/2008 | Hsiang |
| 2008/0165848 | A1 | 7/2008 | Yan et al. |
| 2008/0187042 | A1 | 8/2008 | Jasinschi |
| 2009/0003718 | A1 | 1/2009 | Liu et al. |
| 2009/0161756 | A1 | 6/2009 | Lin |
| 2009/0219994 | A1 | 9/2009 | Tu et al. |
| 2009/0262798 | A1 | 10/2009 | Chiu et al. |

FOREIGN PATENT DOCUMENTS

| | | |
|---|---|---|
| WO | 94/03988 | 2/1994 |
| WO | 2006/079997 | 8/2006 |
| WO | 2007/008286 | 1/2007 |
| WO | 2007/009875 | 1/2007 |
| WO | 2007/018669 | 2/2007 |
| WO | 2007/042365 | 4/2007 |

OTHER PUBLICATIONS van der Schaar et al., "Unconstrained Motion Compensated Temporal Filtering (UMCTF) Framework for Wavelet Video Coding," *IEEE*, pp. II-581 through II-584 (2003).

"10. Configuring mythfrontend," downloaded from the World Wide Web, 7 pp. (downloaded Oct. 17, 2007).

Braun et al., "Motion-Compensating Real-Time Format Converter for Video on Multimedia Displays," *Proceedings IEEE 4th International Conference on Image Processing*, vol. I, pp. 125-128 (Oct. 1997).

Defee et al., "Nonlinear Filters in Image Pyramid Generation," *IEEE International Conference on Systems Engineering*, pp. 269-272 (Aug. 1991).

Elad et al., "Super-Resolution Restoration of an Image Sequence—Adaptive Filtering Approach," 24 pp. [retrieved from http://citeseer.nj.nec.com/342620.html on Apr. 30, 2001).

Haddad et al., "Digital Signal: Theory, Applications, and Hardware," *Computer Science Press*, pp. 257-261 (Jan. 1991).

Hsia et al., "A Parallel Median Filter with Pipelined Scheduling for Real-Time 1D and 2D Signal Processing," *IEICE Trans. Fundamentals*, vol. E83-A, No. 7, pp. 1396-1404 (Jul. 2000).

International Organization for Standardization, "MPEG-4 Video Verification Model version 18.0," ISO/IEC JTC1/SC29/WG11 N3908, pp. 1-10, 299-311 (Jan. 2001).

Kim et al., "Spatio-temporal Adaptive 3-D Kalman Filter for Video," *IEEE Trans. On Image Process.*, vol. 6, No. 3, pp. 414-423 (Mar. 1997) (12 pp. printout).

Kopp et al., "Efficient 3x3 Median Filter Computations," *Institute of Computer Graphics and Algorithms*, Vienna University of Technology, Technical Report TR-186-2-94-18, 4 pp. (Dec. 1994).

Kotropoulos et al., "Adaptive LMS L-filters for Noise Suppression in Images," *IEEE Transactions on Image Processing*, vol. 5, No. 12, pp. 1596-1609 (1996) [48 pp. retrieved from http://citeseer.nj.nec.com/kotropoulos96adaptive.html on Apr. 30, 2001].

Kwon et al., "Adaptive Bitrate Allocation in Spatial Scalable Video Coding of Fixed Total Bitrate," *IEICE Trans. Fundamentals*, vol. E81-A, No. 5, pp. 950-956 (May 1998).

Munsil et al., "DVD Benchmark—Special Report, The Chroma Upsampling Error and the 4:2:0 Interlaced Chroma Problem," downloaded from the World Wide Web, 19 pp. (document marked Apr. 1, 2001).

Nadenau, "Integration of Human Color Vision Models into High Quality Image Compression," Thesis, 216 pp. (2000).

Orton-Jay et al., "Encoding for Blu-ray Disc and HD-DVD—Reaping the Benefits of Integrated Mastering," *SONIC Digital Vision*, 22 pp. (document marked Apr. 12, 2007).

Ranka et al., "Efficient Serial and Parallel Algorithm for Median Filtering," *IEEE Transactions on Signal Processing*, vol. 39, Issue 6, pp. 1462-1466 (Jun. 1991).

Reeves, "On the Selection of Median Structure for Image Filtering," *IEEE Transactions on Circuits and Systems II: Analog and Digital Signal Processing*, vol. 42, pp. 556-558 (Aug. 1995) (12 pp. printout).

Russ, "The Image Processing Handbook," 2nd Edition, CRC Press, pp. 164-166 (month unknown 1994).

Senel et al., "Topological Median Filters," 44 pp. [Retrieved from http://citeseer.nj.nec.com/277604.html on Apr. 30, 2001].

Tomasi et al., "Bilateral Filtering for Gray and Color Images," *IEEE Int'l Conf. on Computer Vision*, 8 pp. (Jan. 1998).

Tramini et al., "Intraframe Image Decoding Based on a Nonlinear Variational Approach," *International Journal of Imaging Systems and Technology*, vol. 9, No. 5, pp. 369-380 (22 pp. prinout) (Dec. 1998).

Tsekeridou et al., "Morphological Signal Adaptive Median Filter for Still Image and Image Sequence Filtering," *IEEE Int. Symposium on Circuits and Systems*, 4 pp. (May 1998).

van Roosmalen et al., "Noise Reduction of Image Sequences as Preprocessing for MPEG2 Encoding," *Proceedings of EUSIPCO*, 4 pp. (Sep. 1998).

"VC-1/PEP and POSTERIZATION," AVS Forum, downloaded from the World Wide Web, 13 pp. (document marked Apr. 27, 2007).

Wang et al., "Adaptive Image Matching in the Subband Domain," *Proc. SPIE*, 12 pp. (Dec. 2004).

Wong, "Nonlinear Scale-Space Filtering and Multiresolution Systems," *IEEE Transactions on Image Processing*, vol. 4, No. 6, pp. 774-787 (Jun. 1995).

Wu et al., "Bit-depth scalability compatible to H.264/AVC-scalable extension," *J. Vis. Commun. Image R.*, vol. 19, pp. 372-381 (Jun. 2008).

Yli-Harja et al., "Efficient Representation and Implementation of Recursive Median Filters and Their Cascade Compositions," *Proceedings of the Finnish Signal Processing Symposium*, Oulu, Finland, pp. 84-88 (May 1999).

Yli-Harja et al., "Run-length Distributions of Recursive Median Filters Using Probabilistic Automata," *Proceedings of Scandinavian Conference on Image Analysis*, Kangerlussuaq, Greenland, pp. 251-258 (Jun. 1999).

* cited by examiner

Figure 1, prior art

Software 280 implementing filtering to reduce key picture popping effects

REDUCING KEY PICTURE POPPING EFFECTS IN VIDEO

BACKGROUND

Engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system.

In general, video compression techniques include "intra-picture" compression and "inter-picture" compression. Intra-picture compression techniques compress an individual picture (without reference to other pictures that have been compressed and reconstructed). Inter-picture compression techniques compress a picture with reference to preceding and/or following picture(s) (often called reference or anchor pictures) that have already been compressed and reconstructed. A "key" picture is an intra-picture compressed picture that can be used as a reference picture for other pictures.

Intra-Picture and Inter-Picture Compression

To illustrate basic principles of intra-picture compression and inter-picture compression, consider an example block-based encoder and corresponding decoder. Real-world implementations of encoders and decoders are much more complex, of course, but these simplified examples show some of the ways that intra-picture compression typically differs from inter-picture compression.

The encoder performs intra-picture compression of an 8×8 block of samples for a key picture. The encoder splits the key picture into non-overlapping 8×8 blocks of samples and applies a forward 8×8 frequency transform to individual blocks. The frequency transform maps the sample values of a block to transform coefficients. In typical encoding scenarios, a relatively small number of frequency coefficients capture much of the energy or signal content in the block.

The encoder quantizes the transform coefficients, resulting in an 8×8 block of quantized transform coefficients. Quantization can affect the fidelity with which the transform coefficients are encoded, which in turn can affect bit rate. Coarser quantization tends to decrease fidelity to the original transform coefficients as the coefficients are more coarsely approximated. Bit rate also decreases, however, when decreased complexity can be exploited with lossless compression. Conversely, finer quantization tends to preserve fidelity and quality but result in higher bit rates. The encoder further encodes the quantized transform coefficients, for example, using entropy coding, and outputs a bitstream of compressed video information.

In corresponding decoding, a decoder reads the bitstream of compressed video information and performs operations to reconstruct the pictures that were encoded. When the encoding uses lossy compression (e.g., in quantization), the reconstructed pictures approximate the source pictures that were encoded but are not exactly the same.

For example, to reconstruct a version of the original 8×8 block of the key picture, the decoder reconstructs quantized transform coefficients, for example, using entropy decoding. The decoder inverse quantizes the quantized transform coefficients of the block and applies an inverse frequency transform to the de-quantized transform coefficients, producing the reconstructed version of the original 8×8 block. Since the key picture is used as a reference picture in subsequent motion compensation, the encoder also reconstructs the key picture.

Inter-picture compression techniques often use motion estimation and motion compensation to reduce bit rate by exploiting temporal redundancy in video. Motion estimation is a process for estimating motion between pictures. In general, motion compensation is a process of producing predictions from reference picture(s) (such as previously encoded/decoded key picture(s)) using motion data. An encoder and decoder store previously coded/decoded pictures in a picture store. The reference pictures in the picture store can then provide motion-compensated predictor blocks for the blocks of a current picture being encoded.

The encoder generally divides an inter-coded picture into rectangular, non-overlapping blocks of N×M samples. For a current block being encoded, the encoder attempts to a find a matching block in a reference picture. The reference picture's block is then used as a motion-compensated prediction for the current block. The reference picture's block can be at the same spatial location as the current block being encoded, or it can be at a different location, as indicated with a motion vector or some other form of motion data. Typically, the encoder does not find a perfect match. For this reason, the encoder computes the sample-by-sample difference between the current block and its motion-compensated prediction to determine a residual (also called error signal). The residual is frequency transformed, quantized, and entropy encoded. When motion compensation works well, the amount of bits used to encode motion-compensation residuals is small.

If a predicted picture is itself used as a reference picture for subsequent motion compensation, the encoder reconstructs the predicted picture. When reconstructing residuals, the encoder reconstructs transform coefficients that were quantized and performs an inverse frequency transform. The encoder performs motion compensation to compute motion-compensated predictors, and combines the predictors with the residuals. During decoding, a decoder typically entropy decodes information and performs analogous operations to reconstruct residuals, perform motion compensation, and combine the predictors with the reconstructed residuals.

In general, an encoder varies quantization to trade off quality and bit rate. A basic goal of lossy compression is to provide good rate-distortion performance. So, for a particular bit rate, an encoder attempts to provide the highest quality of video. Or, for a particular level of quality/fidelity to the original video, an encoder attempts to provide the lowest bit rate encoded video. In practice, considerations such as encoding time, encoding complexity, encoding resources, decoding time, decoding complexity, decoding resources, overall delay, and/or smoothness in quality/bit rate changes can also affect decisions made in codec design as well as decisions made during actual encoding.

As to the goal of smoothness in quality changes, many encoders seek to maintain a constant or relatively constant quality level from picture to picture. Such encoders usually adjust quantization or other parameters within the encoder to regulate the quality of the reconstructed pictures. Other encoders, under the assumption that allocating additional bits to key pictures may improve the quality of motion-compensated predictions using those key pictures (and hence improve the quality of non-key pictures), seek to encode key pictures at higher quality than non-key pictures.

Key Picture Popping Effects

In some scenarios, encoding results in key picture "popping" effects between key pictures and non-key pictures. For example, during playback of decoded video, key picture popping effects are perceptible as changes in quality between key pictures encoded using intra-picture compression and non-key pictures encoded using inter-picture compression.

FIG. 1 illustrates a simplified example of key picture popping effects. A series of video pictures includes the six video pictures (101 to 106) shown in FIG. 1. Each of the six video pictures (101 to 106) includes star shapes whose jagged edges add texture detail. (The stars are meant to depict objects containing an amount of spatial detail, such as the points of the stars.) Using typical encoder settings, one video picture (103) is encoded as a key picture using intra-picture compression. The remaining video pictures (101, 102, 104, 105, 106) are encoded using inter-picture compression.

After the encoding and decoding, the reconstructed video pictures (141 to 146) exhibit key picture popping effects. In particular, there are noticeable quality changes at the transitions to and from the reconstructed key picture (143). The key picture (143), encoded using intra-picture compression, maintains the spatial detail from the corresponding source video picture (103). Spatial detail was lost during encoding, however, for the other reconstructed video pictures (141, 142, 144, 145, 146). (The loss of detail is depicted by smoothing out the jagged edges and points of the stars.) The perceptual effects of key picture popping can be quite disruptive, as details that are clear in one picture (e.g., key picture 143) are blurred or missing in later pictures (e.g., picture 144). When key pictures are regularly spaced among non-key pictures, key picture popping effects can be periodic and particularly noticeable.

Key picture popping effects can be expected when an encoder deliberately seeks to encode key pictures at higher quality than non-key pictures. Even when encoders seek to encode key pictures at the same quality as non-key pictures, however, key picture popping effects can surface. Intra-compressed pictures tend to retain higher spatial frequency information content than inter-compressed pictures, even when the same quantization is applied. The discrepancy in the amount of spatial detail retained becomes worse at higher quantization levels, and noticeable popping effects accordingly become worse.

While previous approaches to regulating quality from picture to picture in encoding provide acceptable performance in some scenarios, they do not have the advantages of the techniques and tools described below for reducing key picture popping effects.

SUMMARY

In summary, the detailed description presents techniques and tools for reducing key picture popping effects in video. For example, an encoding tool selectively filters video pictures to be encoded as key pictures, so as to remove detail in the filtered pictures relative to one or more other video pictures to be encoded using inter-picture compression. This helps make video quality more uniform from picture to picture after decoding, which improves the viewing experience.

According to a first aspect of the techniques and tools, a tool such as a video encoding system filters a video picture that is to be encoded as a key picture using intra-picture compression. The filtering reduces detail in the picture relative to other video pictures that are to be encoded using inter-picture compression. For many encoding scenarios, the filtering reduces key picture popping effects by selectively attenuating detail in the video picture that is to be encoded as a key picture. The tool can use a key picture filter strength parameter to control strength of the filtering. The tool encodes the filtered video picture using intra-picture compression and encodes the other video pictures using inter-picture compression.

According to another aspect of the techniques and tools, a tool filters a video picture for pre-processing before video encoding or for another purpose. The tool encodes the video picture using inter-picture compression and decodes the encoded picture. The tool creates a filtered video picture using the decoded picture and the video picture from before the encoding. In this way, detail lost in the inter-picture compression is selectively attenuated in the filtered picture.

According to another aspect of the techniques and tools, an encoding tool includes a user interface mechanism, a means for filtering video pictures to be encoded as key pictures, and a video encoder. In operation, the user interface mechanism sets a key picture filter strength parameter that weights filtering to reduce detail in the video pictures that are to be encoded as key pictures, relative to other video pictures.

The foregoing and other objects, features, and advantages will become more apparent from the following detailed description, which proceeds with reference to the accompanying figures. This summary is provided to introduce a selection of concepts in a simplified form that are further described below in the detailed description. This summary is not intended to identify key features or essential features of the claimed subject matter, nor is it intended to be used to limit the scope of the claimed subject matter.

DETAILED DESCRIPTION

The present application relates to techniques and tools for reducing key picture popping effects. For example, prior to encoding, an encoding tool filters video pictures that will be encoded as key pictures so as to selectively reduce detail in the pictures. By selectively removing details likely to be lost in inter-picture compression, the tool makes the level of detail in reconstructed pictures more consistent from picture to picture, reducing key picture popping effects.

One way to filter a video picture is to encode the picture using inter-picture compression, decode the picture, and then combine the decoded picture with the version of the picture from before the inter-picture compression. Details lost in other pictures in inter-picture compression are also typically lost in the decoded picture. Details preserved in the other pictures are likely preserved in the decoded picture. By blending the decoded picture with its pre-compression version, details of the picture are selectively attenuated, in a spatially adaptive way, in regions where key picture popping effects would otherwise be more noticeable.

Various alternatives to the implementations described herein are possible. For example, an encoding tool can use adaptive low-pass filtering to selective attenuate detail in key video pictures. Or, the tool can use another filtering mechanism to selective attenuate detail. Certain techniques described with reference to flowchart diagrams can be altered by changing the ordering of stages shown in the flowcharts, by splitting, repeating or omitting certain stages, etc. The various techniques and tools described herein can be used in combination or independently. Different embodiments implement one or more of the described techniques and tools.

Some of the techniques and tools described herein address one or more of the problems noted in the background. Typically, a given technique/tool does not solve all such problems. Rather, in view of constraints and tradeoffs in encoding time, resources, and/or quality, the given technique/tool improves encoding performance for a particular implementation or scenario.

I. Computing Environment.

Figure 2:
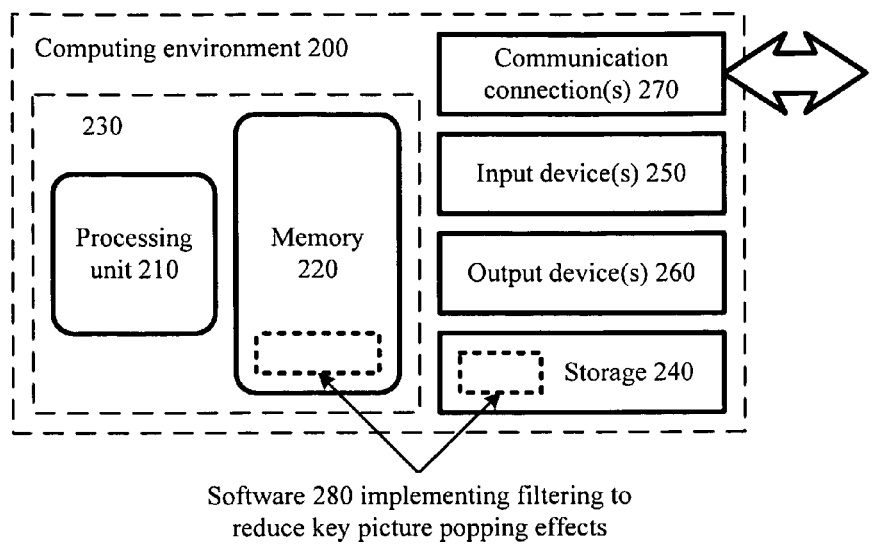
FIG. 2 is a block diagram of a suitable computing environment in which several described embodiments may be implemented.

FIG. 2 illustrates a generalized example of a suitable computing environment (200) in which several of the described embodiments may be implemented. The computing environment (200) is not intended to suggest any limitation as to scope of use or functionality, as the techniques and tools may be implemented in diverse general-purpose or special-purpose computing environments.

With reference to FIG. 2, the computing environment (200) includes at least one processing unit (210) and memory (220). In FIG. 2, this most basic configuration (230) is included within a dashed line. The processing unit (210) executes computer-executable instructions and may be a real or a virtual processor. In a multi-processing system, multiple processing units execute computer-executable instructions to increase processing power. The memory (220) may be volatile memory (e.g., registers, cache, RAM), non-volatile memory (e.g., ROM, EEPROM, flash memory, etc.), or some combination of the two. The memory (220) stores software (280) implementing filtering to reduce key picture popping effects.

A computing environment may have additional features. For example, the computing environment (200) includes storage (240), one or more input devices (250), one or more output devices (260), and one or more communication connections (270). An interconnection mechanism (not shown) such as a bus, controller, or network interconnects the components of the computing environment (200). Typically, operating system software (not shown) provides an operating environment for other software executing in the computing environment (200), and coordinates activities of the components of the computing environment (200).

The storage (240) may be removable or non-removable, and includes magnetic disks, magnetic tapes or cassettes, CD-ROMs, DVDs, or any other medium which can be used to store information and which can be accessed within the computing environment (200). The storage (240) stores instructions for the software (280) implementing the filtering to reduce key picture popping effects.

The input device(s) (250) may be a touch input device such as a keyboard, mouse, pen, or trackball, a voice input device, a scanning device, or another device that provides input to the computing environment (200). For audio or video encoding, the input device(s) (250) may be a sound card, video card, TV tuner card, or similar device that accepts audio or video input in analog or digital form, or a CD-ROM or CD-RW that reads audio or video samples into the computing environment (200). The output device(s) (260) may be a display, printer, speaker, CD-writer, or another device that provides output from the computing environment (200).

The communication connection(s) (270) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (200), computer-readable media include memory (220), storage (240), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "create" and "determine" to describe computer operations in a computing environment. These terms are high-level abstractions for operations performed by a computer, and should not be confused with acts performed by a human being. The actual computer operations corresponding to these terms vary depending on implementation.

II. A Generalized Video Processing System.

Figure 3:
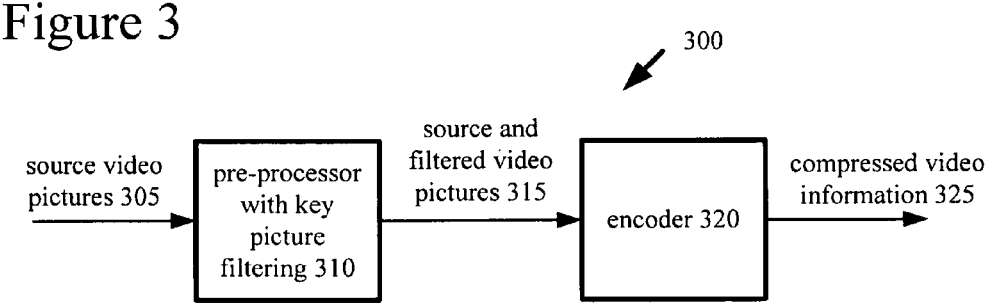
FIG. 3 is a block diagram of a generalized video processing system with which several described embodiments may be implemented.

FIG. 3 is a block diagram of a generalized video processing system (300) in conjunction with which some described embodiments may be implemented. The system (300) receives a sequence of source video pictures (305) and produces compressed video information (325) as output to storage, a buffer, or a communications connection.

The term "picture" generally refers to source, coded or reconstructed image data. For progressive video, a picture is a progressive video frame. For interlaced video, a picture may refer to an interlaced video frame, the top field of the frame, or the bottom field of the frame, depending on the context. A source video picture, generally, is a video picture from a video source such as a camera, storage media or communication connection, which may have already been subjected to filtering, editing, or other pre-processing before encoding.

The system (300) includes a pre-processor (310) that performs pre-processing before encoding. For example, the pre-processor (310) receives source video pictures (305) and selectively filters source video pictures that will be encoded as key pictures. The pre-processor (310) can use any of the approaches described below for filtering. The filtering can remove detail that is likely to be lost in inter-picture compression, which helps make key picture popping effects less noticeable in transitions to and from key pictures. The pre-processor (310) can also perform low-pass filtering of video pictures (including key pictures and other pictures) and/or add dithering for source format conversion or other operations. As used herein, the terms "filtering" and "filter" encompass the convolution of samples in a kernel or window (e.g., implementing low-pass filtering) but more generally encompass operations (e.g., blending of samples in versions of a picture) that alter sample values or the characteristics of samples.

The system (300) also includes an encoder (320) that compresses the pre-processed video pictures (315), outputting a bitstream of compressed video information (325). The exact operations performed by the encoder (320) can vary depending on compression format, but include intra-picture compression operations as well as inter-picture compression operations. The format of the output bitstream can be a Windows Media Video or SMPTE 421M ("VC-1") format, MPEG-x format (e.g., MPEG-1, MPEG-2, or MPEG-4), H.26x format (e.g., H.261, H.262, H.263, or H.264), or other format.

The relationships shown between modules within the system (300) indicate general flows of information in the system; other relationships are not shown for the sake of simplicity. Particular embodiments typically use a variation or supplemented version of the generalized system (300). Depending on implementation and the type of processing desired, modules of the system can be added, omitted, split into multiple modules, combined with other modules, and/or replaced with like modules. For example, the encoder can be split into multiple modules associated with different stages of encoding. In alternative embodiments, systems with different modules and/or other configurations of modules perform one or more of the described techniques.

III. Reducing Key Picture Popping Effects.

This section describes techniques and tools for using filtering to reduce key picture popping effects. In particular, various mechanisms are described for reducing detail in key pictures, so as to make the level of detail more consistent from picture to picture after decoding.

A. Theory and Explanation.

Intra-compressed pictures typically keep higher frequency information content than inter-compressed pictures, even when both types of pictures are quantized using the same strength of quantizer. When the pictures are decoded and played back, this can result in a noticeably visible "popping" as an intra-compressed picture retains finer detail than the inter-compressed pictures before and after it. The term "key picture popping" encompasses such temporal discontinuities. Since intra-compressed pictures are often interspersed among inter-compressed pictures at regular intervals in a video sequence, the content can appear to pulse, sharpen or otherwise "pop" periodically as reconstructed, intra-compressed pictures are displayed. Key picture popping effects are difficult to manage using quantization adjustments of typical encoders.

Techniques and tools described herein help reduce visible temporal artifacts caused when the overall prediction type of a reconstructed video picture changes from inter-picture compression to intra-picture compression, or vice versa. Unlike approaches that attempt to regulate quality by adjusting quantization during encoding, many of the techniques and tools described herein filter video pictures prior to encoding them as key pictures, so as to reduce detail in the key pictures prior to encoding. For example, a pre-processor filters a picture so that the picture includes a level of detail after intra-picture compression/decompression that is comparable to the level of detail it would include after inter-picture compression/decompression. This helps mitigate visible temporal discontinuities associated with key picture popping effects.

Figure 4:
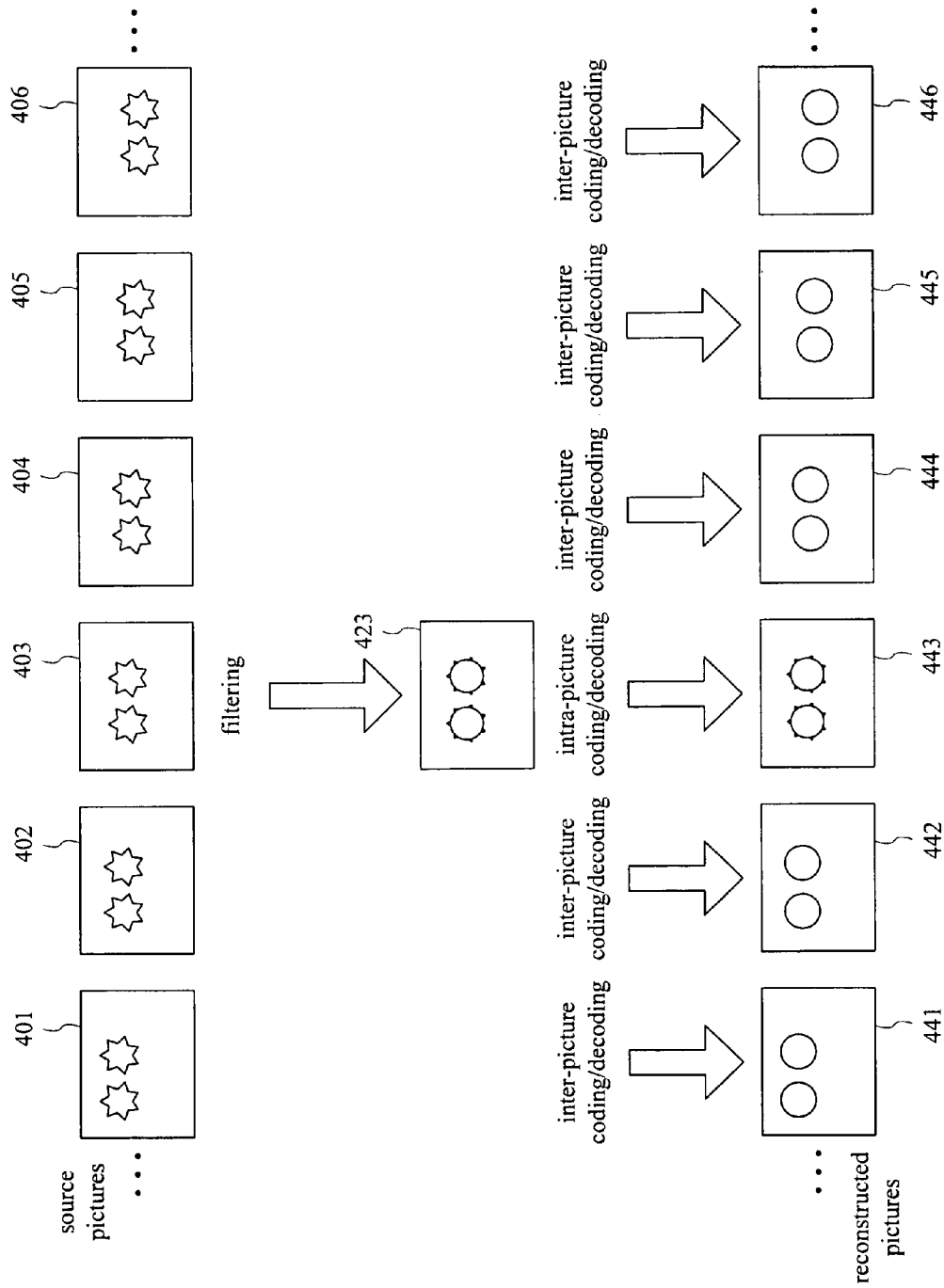
FIG. 4 is a diagram illustrating selective reduction of detail in a video picture to be encoded as a key picture.

To illustrate, FIG. 4 shows a simplified example of the use of filtering to mitigate key picture popping effects. A series of video pictures includes six video pictures (401 to 406). As in FIG. 1, each of the six video pictures (401 to 406) includes star shapes whose jagged edges add texture detail. One video picture (403), which is to be encoded as a key picture using intra-picture compression, is filtered before encoding. The filtering selectively reduces detail in the picture (403), for example, using adaptive low-pass filtering or weighted averaging of different versions of the picture (403). As a result of the filtering in this example, some but not all of the detail in the filtered video picture (423) is attenuated. (In FIG. 4, the partial loss of detail is represented by smoothing out the jagged edges of the star shapes, but keeping some detail for the points.)

Using typical encoder settings, the filtered video picture (423) is encoded as a key picture using intra-picture compression. The remaining video pictures (401, 402, 404, 405, 406) are encoded using inter-picture compression.

Figure 1:
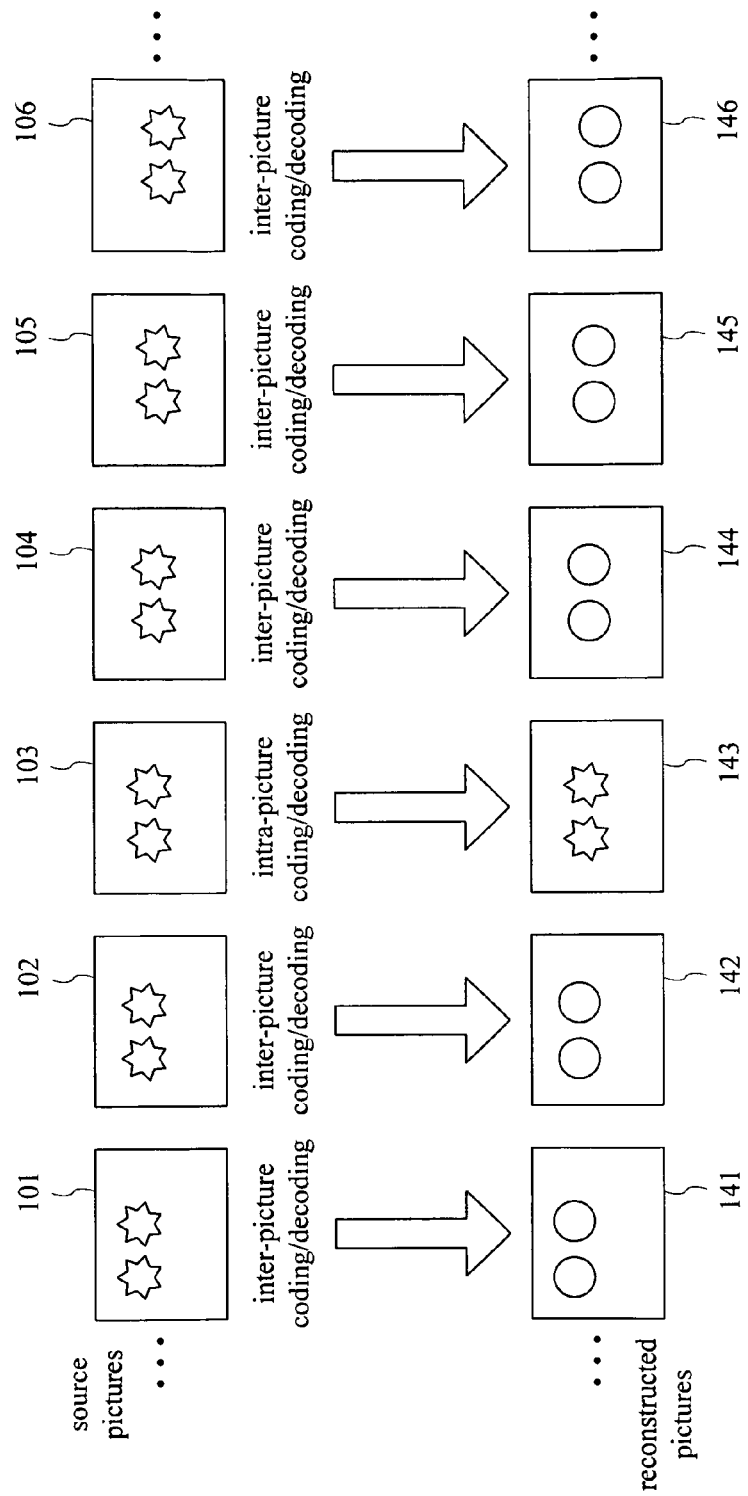
FIG. 1 is a diagram illustrating key picture popping effects according to the prior art.

After encoding and decoding, the reconstructed video pictures (441 to 446) may still have discernible key picture popping effects (depending on the strength of the filtering), but the magnitude of the key picture popping effects is much reduced compared to the reconstructed pictures (141 to 146) shown in FIG. 1. In particular, at the transitions to and from the reconstructed key picture (443), discontinuities in the level of detail are much less abrupt. The key picture (443), encoded using intra-picture compression, maintains the spatial detail from the filtered video picture (423). Detail in the other pictures (441, 442, 444, 445, 446) is lost during inter-picture compression of the pictures. (As in FIG. 1, the loss of detail is depicted by smoothing out the points of the stars.) While this process results in loss of some detail for the reconstructed key picture (443), overall perceived quality improves due to better continuity in the level of detail from picture to picture.

Aside from the overall approaches, innovative details of the techniques and tools described herein include but are not limited to the following.

1. Adaptively applying an appropriate amount of filtering to detail regions of a key picture in order to reduce key picture popping artifacts. For example, regions of the picture where key picture popping effects would be more noticeable are filtered more than regions where key picture popping effects would be less noticeable. Appropriate regions to filter and/or appropriate strength of filtering can be determined using texture detection or by considering an inter-compressed version of the picture in which some details are attenuated.
2. Implementing filtering as a weighted average of versions of a key picture before versus after inter-picture compression/decompression. This is one way to determine an effective, appropriate amount of detail filtering to reduce key picture popping effects.
3. Using a single filter strength parameter to control the strength of filtering. For example, the parameter weights averaging between a decoded version of a key picture (after inter-picture compression/decompression) and a source version of the key picture. Independent of adaptation of filtering within a picture, the filter strength parameter can help balance key-picture detail loss versus reduction in key picture popping effects.

B. Filtering to Reduce Key Picture Popping Effects.

Figure 5:
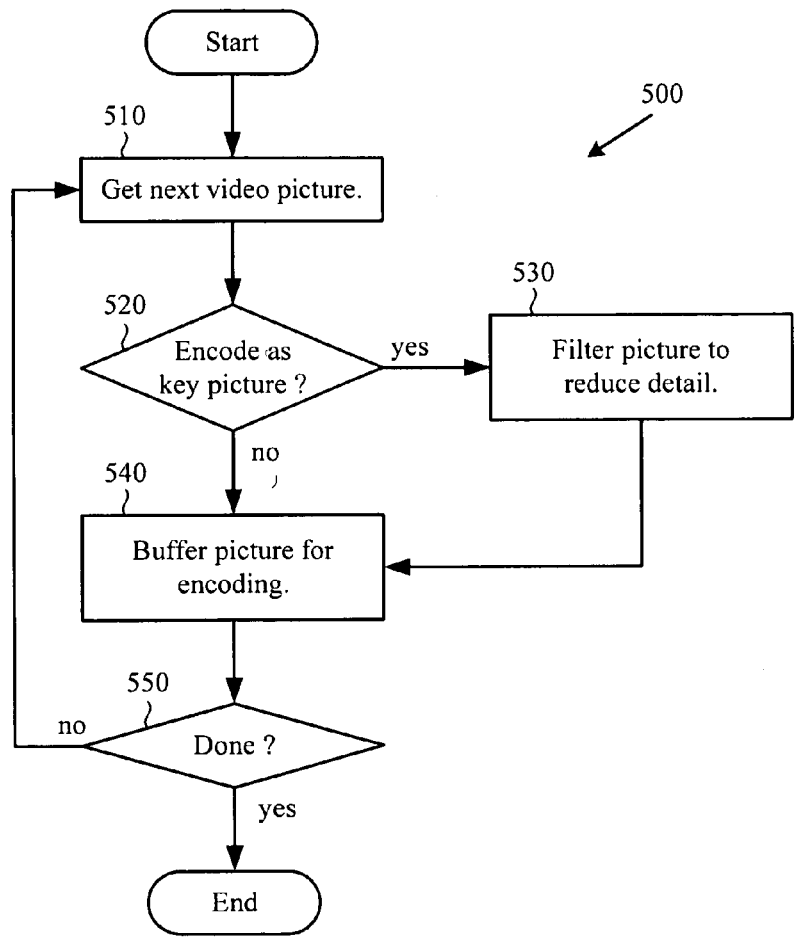
FIG. 5 is a flowchart illustrating a generalized technique for selectively filtering a video picture to be encoded as a key picture so as to reduce detail.

FIG. 5 shows a technique (500) for filtering video pictures to reduce key picture popping effects. A tool such as the video processing system (300) shown in FIG. 3 or other tool performs the technique (500).

To start, the tool gets (510) the next source video picture to be processed and determines (520) whether the picture is to be encoded as a key picture. For example, the tool processes pictures in display order from a video source such as a camera or other capture device, storage media, or communication connection. Alternatively, the tool processes pictures in some other order.

If the picture is to be encoded as a key picture, the tool filters (530) the picture to reduce detail in the picture. The filtering can be adaptive as to strength of the filtering from region to region within the picture, and it can be adaptive as to the overall strength of the filtering (for example, as controlled by a key picture filter strength parameter). Example filter implementations are described in the next section. Alternatively, the tool uses another filter implementation for the filtering (530).

The tool then buffers (540) the picture for encoding. In some cases (e.g., when no filtering is performed), the picture is already buffered for encoding. For some pictures, the actual encoding of the picture can begin immediately. For other pictures (e.g., when coded order differs from display order such that the current picture may reference a later picture in display order), actual encoding of the current picture may begin later.

The tool determines (550) whether to end or continue by getting (510) the next picture to process. As FIG. 5 shows, the tool repeats the technique (500) on a picture-by-picture basis. Alternatively, the technique is repeated on some other basis.

C. Example Filtering Mechanisms.

In some embodiments, the filtering of a picture is implemented by blending sample values of the picture with sample values of a reconstructed version of the picture after compression. For example, the picture is encoded using inter-picture compression, then decoded, and then averaged with a pre-encoding version of the picture. This filtering can help adaptively remove detail in the picture from region to region in the same way as the detail is lost the inter-picture compression, without introducing blurring by filtering regions in which detail is preserved.

Figure 6:
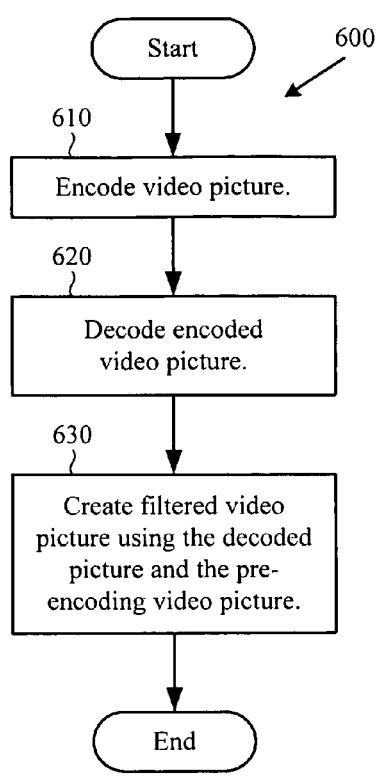
FIG. 6 is a flowchart illustrating a generalized technique for filtering a video picture by blending the picture with a compressed/reconstructed version of the picture.

FIG. 6 shows a generalized technique (600) for filtering a video picture by blending the picture with a reconstructed, previously compressed version of the picture. A tool such as the video processing system (300) shown in FIG. 3 or other tool performs the technique (600) for key picture popping effect reduction or other selective detail reduction.

To start, the tool encodes (610) the video picture. For example, the tool uses inter-picture compression so as to identify detail lost in the inter-picture compression. Alternatively, the tool performs intra-picture compression to identify detail lost in the intra-picture compression. The details of the compression depend on the type of encoding (e.g., VC-1 encoding, H.264 encoding). After encoding (610), the tool decodes (620) the encoded video picture.

The tool then creates (630) a filtered video picture using the decoded picture and a pre-encoding version of the video picture. For example, on a sample-by-sample basis, the tool blends corresponding sample values in the decoded picture and pre-encoding version of the picture. In some implementations, the tool simply averages two values from the respective pictures. In other implementations, the tool computes a weighted average, with weighting set by a control parameter.

The tool can repeat the technique (600) on a picture-by-picture basis or on some other basis.

Figure 7:
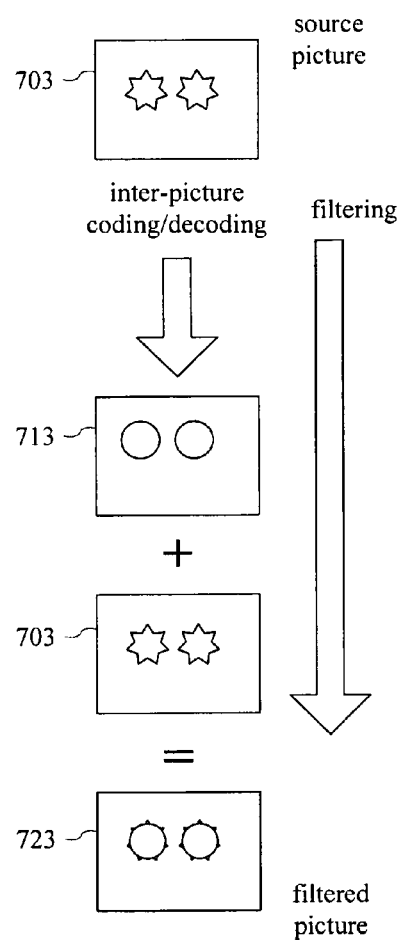
FIG. 7 is a diagram illustrating filtering of a video picture by blending the picture with an inter-picture compressed/reconstructed version of the picture.

FIG. 7 illustrates filtering of a video picture by blending the picture with a reconstructed, inter-picture compressed version of the picture. As in FIGS. 1 and 4, the to-be-filtered picture (703) includes star shapes signifying detail.

To implement the filtering, the picture (703) is encoded using inter-picture compression and decoded using inter-picture decompression. The inter-picture compression reduces detail in the decoded, reconstructed version of the picture (713). (In FIG. 7, the loss of detail is depicted in the reconstructed picture (713) as smoothing out of the jagged edges of the star shapes.)

The reconstructed picture (713) and original picture (703) are then averaged to created the filtered picture (723). The filtered picture (723) typically lacks at least some of the detail from the pre-encoding version of the picture (703), due to removal of detail in the inter-picture compression. FIG. 7 shows a blending in which some details from the pre-encoding picture (703) are preserved in the filtered picture (723), but many other details are attenuated. Generally, the amount of weight given to sample values from the respective pictures can vary to change the strength of the filtering effects. Region-by-region variations in the detail lost are similar to losses in inter-picture compression of the picture. If the filtered picture (723) is then encoded as a key picture using intra-picture compression, after reconstruction the picture looks to some degree (depending on strength of filtering) like it would have looked after inter-picture compression. In many cases, this reduces key picture popping effects.

Figure 8:
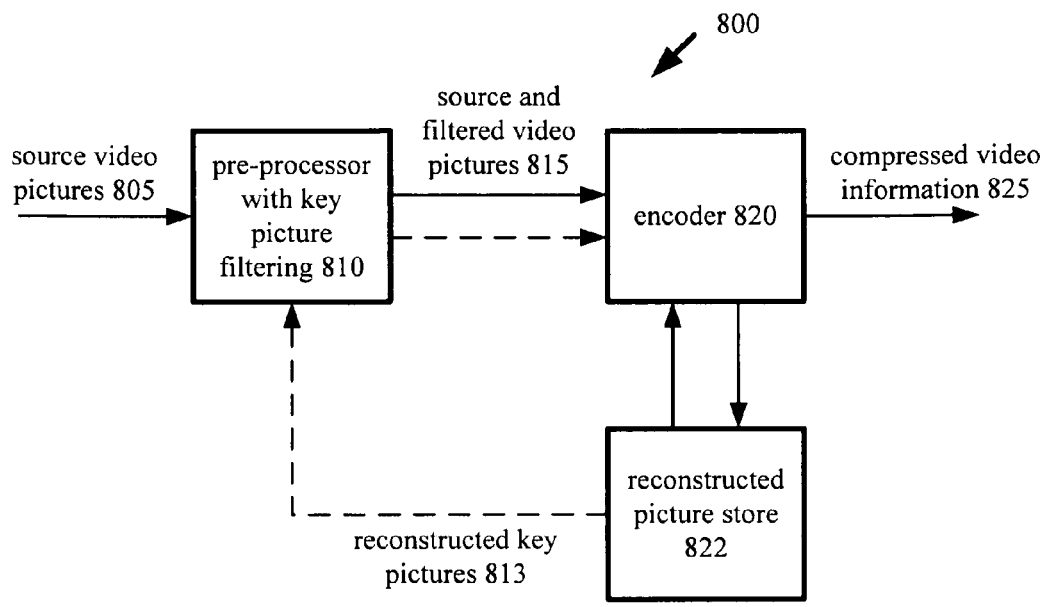
FIG. 8 is a block diagram of a tool that implements filtering by blending video pictures with inter-picture compressed/reconstructed versions of the pictures.

FIG. 8 shows an encoding system (800) that implements filtering by blending video pictures with reconstructed, inter-picture compressed versions of the respective video pictures. Like the system (300) shown in FIG. 3, the system (800) receives a sequence of source video pictures (805) and produces compressed video information (825) as output to storage, a buffer, or a communications connection.

The system (800) includes a pre-processor (810) that filters key pictures before encoding, as well as an encoder (820) that compresses pictures (815) from the pre-processor (810). The pre-processor (810) works with the encoder (820) to filter key pictures. For example, the encoder (820) encodes a key picture using inter-picture compression, then decodes the key picture and buffers it in the reconstructed picture store (822). The pre-processor (810) reads the reconstructed picture (813) from the picture store (822) and blends it with the pre-encoding version of the key picture. The encoder (820) then encodes the filtered key picture using intra-picture compression.

The exact operations performed by the encoder (820) can vary depending on compression format, as explained with reference to FIG. 3. Moreover, the overall organization of the system (800) can vary depending on implementation, as explained with reference to FIG. 3.

D. Key Picture Filter Strength Parameter.

In some embodiments, a key picture filter strength parameter helps control the strength of filtering of detail from key pictures. Filtering detail from key pictures can hurt the quality of the key pictures themselves, but it can also help reduce key picture popping effects. A filter strength parameter can be used to adjust the balance of key-picture detail loss versus reduction in key picture popping effects.

The key picture filter strength parameter can be set by an encoding tool in reaction to user input to the interface of the encoding tool. For example, the parameter is set using a button control, checkbox control, slider control or other control, or the parameter is set through an encoding wizard or other software interface. Or, the encoding tool sets the parameter in reaction to instructions from software that programmatically controls the encoding tool. The key picture filter strength parameter can be set on a session-by-session basis for encoding sessions. Alternatively, the parameter value can vary within an encoding session or on some other basis.

In some implementations, a pre-processor uses a key picture filter strength parameter a to control weighted averaging between two versions of a picture. For example, each sample i in a filtered picture m has its value set as follows:

$$m[i]=o[i]*(1-a)+r[i]*a,$$

where r[i] is the sample value at location i in the reconstructed picture r, and o[i] is the sample value at location i in the original source picture o. The strength coefficient a has a value between 0.0 and 1.0, and controls the weights for the weighted averaging of r[i] and o[i]. If a=0.0, there is effectively no filtering of the source and reconstructed pictures, and m[i]=o[i]. Key picture popping effects are not affected. At the other extreme, if a=1.0, the filtering is strongest, and m[i]=r[i]. Reduction of key picture popping effects is strongest. A value of a between these two extremes modulates the strength of the filtering operation, weighting the relative contributions of r[i] and o[i] to m[i]. Depending on implementation, key picture filtering can be on or off by default. In some implementations, the default value for the key picture filter strength parameter is a=0.5 when key picture filtering is enabled. Alternatively, the key picture filter strength parameter has a different range of possible values, or the encoding tool uses multiple parameters and a different approach to blending.

E. Alternatives and Extensions.

The preceding examples focus on uses of filter mechanisms to reduce key picture popping effects in video. Alternatively, the filter mechanisms are used for other pre-processing applications before video encoding, or for other applications.

Many of the preceding examples involve filters that blend sample values of decoded pictures (previously compressed) with sample values of non-encoded pictures. Alternatively, the filtering is implemented with adaptive low-pass filtering. The kernel size used for the low-pass filtering and/or the filter taps can vary to change the strength of filtering from region to region within a picture and/or change the overall strength of the filtering for the picture. A key picture filter strength parameter can control the overall strength of the filtering. The results of inter-picture compression/decompression of the picture can be used to change filter characteristics from region to region within the picture. Or, the adaptive filtering can use a measure of texture detail in the picture to change filter characteristics from region to region within the picture. Alternatively, the filtering uses another filter mechanism.

Having described and illustrated the principles of my invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of my invention may be applied, I claim as my invention all such embodiments as may come within the scope and spirit of the following claims and equivalents thereto.

I claim:

1. A method comprising:
   for a video picture to be encoded as a key picture using intra-picture compression, filtering the video picture to reduce detail relative to one or more other video pictures to be encoded using inter-picture compression;
   encoding the filtered video picture using intra-picture compression; and
   encoding the one or more other video pictures using inter-picture compression.

2. The method of claim 1 further comprising setting a key picture filter strength parameter, wherein strength of the filtering is based at least in part upon the key picture filter strength parameter.

3. The method of claim 2 wherein the key picture filter strength parameter is set in response to user input through a user interface of an encoding tool.

4. The method of claim 2 wherein the key picture filter strength parameter is set on a session-by-session basis by an encoding tool.

5. The method of claim 2 wherein the filtering comprises low-pass filtering using a filter whose strength varies depending on the key picture filter strength parameter.

6. The method of claim 1 wherein the filtering reduces key picture popping effects due to quality changes by selectively attenuating detail in the video picture to be encoded as a key picture.

7. The method of claim 1 wherein the filtering is adaptive from region to region within the video picture and from picture to picture according to a strength parameter.

8. The method of claim 1 wherein the filtering comprises:
   encoding the video picture using inter-picture compression;
   decoding the inter-picture compressed video picture; and
   creating the filtered video picture using the decoded video picture and the video picture from before the encoding using inter-picture compression.

9. The method of claim 8 wherein the inter-picture compression removes detail in the video picture, thereby causing attenuation of the detail in the filtered video picture.

10. The method of claim 8 wherein the creating comprises, on a sample-by-sample basis for plural samples, setting a sample value in the filtered video picture as a weighted average of corresponding sample values in the decoded video picture and the video picture from before the encoding using inter-picture compression.

11. The method of claim 10 wherein a key picture filter strength parameter controls weighting of the weighted average.

12. A method of filtering a video picture, the method comprising:
   encoding the video picture using inter-picture compression;
   decoding the encoded video picture; and
   creating a filtered video picture using the decoded video picture and the video picture from before the encoding, such that detail lost in the inter-picture compression is selectively attenuated in the filtered video picture.

13. The method of claim 12 further comprising encoding the filtered video picture as a key picture using intra-picture compression.

14. The method of claim 13 further comprising:
   encoding one or more other video pictures using inter-picture compression, wherein strength of filtering in the creating the filtered video picture is set to reduce key picture popping effects due to quality changes around the key picture.

15. The method of claim 12 wherein the creating comprises, on a sample-by-sample basis for plural samples, setting a sample value in the filtered video picture as a weighted average of corresponding sample values in the decoded video picture and the video picture from before the encoding.

16. The method of claim 15 wherein a filter strength parameter controls weighting of the weighted average.

17. The method of claim 12 wherein strength of filtering varies within the video picture depending on perceptibility of key picture popping effects.

18. A system comprising:
a user interface mechanism for setting a key picture filter strength parameter to weight filtering to reduce detail in video pictures to be encoded as key pictures, relative to other video pictures;
means for filtering the video pictures to be encoded as key pictures, wherein the filtering is based at least in part upon the key picture filter strength parameter; and
a video encoder for encoding the filtered video pictures using intra-picture compression and for encoding the other video pictures using inter-picture compression.

19. The system of claim 18 wherein the filtering comprises:
using inter-picture compression to encode the video pictures to be encoded as key pictures;
decoding the encoded video pictures to be encoded as key pictures;
blending sample values of the decoded video pictures with corresponding sample values of the video pictures from before the using inter-picture compression.

20. The system of claim 19 wherein the key picture filter strength parameter weights the blending.

* * * * *